United States Patent
Bar-on

(10) Patent No.: US 9,714,855 B2
(45) Date of Patent: Jul. 25, 2017

(54) ULTRASONIC WATER METER

(71) Applicant: Arad Ltd., Dalia (IL)

(72) Inventor: Omri Bar-on, Dalia (IL)

(73) Assignee: Arad Ltd., Dalia (IL)

( * ) Notice: Subject to any disclaimer, the term of this patent is extended or adjusted under 35 U.S.C. 154(b) by 0 days.

(21) Appl. No.: 14/997,810

(22) Filed: Jan. 18, 2016

(65) Prior Publication Data

US 2016/0223373 A1 Aug. 4, 2016

Related U.S. Application Data

(60) Provisional application No. 62/107,797, filed on Jan. 26, 2015, provisional application No. 62/236,334, filed on Oct. 2, 2015.

(51) Int. Cl.
*G01F 1/66* (2006.01)

(52) U.S. Cl.
CPC .............. *G01F 1/667* (2013.01); *G01F 1/662* (2013.01)

(58) Field of Classification Search
USPC ............................ 73/861.28, 861.27, 861.29
See application file for complete search history.

(56) References Cited

U.S. PATENT DOCUMENTS

| | | |
|---|---|---|
| 1,248,058 A | 11/1917 | Bailey |
| 3,282,101 A | 11/1966 | Yamamoto |
| 3,327,806 A | 6/1967 | Anderson |
| 3,392,574 A | 7/1968 | Lemon et al. |
| 3,575,050 A | 4/1971 | Lynnworth |
| 3,653,259 A | 4/1972 | McShane |
| 3,710,621 A | 1/1973 | Asada |
| 3,715,709 A | 2/1973 | Zacharias, Jr. et al. |
| 3,818,757 A | 6/1974 | Brown |
| 3,894,431 A | 7/1975 | Muston et al. |
| 3,935,735 A | 2/1976 | Lee |

(Continued)

FOREIGN PATENT DOCUMENTS

| | | |
|---|---|---|
| CN | 101907472 A | 12/2010 |
| CN | 102680041 A | 9/2012 |

(Continued)

OTHER PUBLICATIONS

"Multical® 21: Data Sheet", Kamstrup, pp. 1-16.
"Hydrus: Ultrasonic Meter", Hydrometer GmbH, pp. 1-8.

*Primary Examiner* — Jewel V Thompson
(74) *Attorney, Agent, or Firm* — The Webb Law Firm

(57) ABSTRACT

An ultrasonic flow meter device includes a piping arrangement, at least two ultrasonic transducers, and at least two reflective elements. The piping arrangement includes a fluid passage extending through a tubular body. The at least two ultrasonic transducers are configured to generate and/or receive an ultrasonic sound wave and the at least two reflective elements are configured to direct the ultrasonic sound wave through a fluid passage in a measurement section of the piping arrangement between the at least two ultrasonic transducers in a travel path that is substantially Z-shaped. A width of the fluid passage in the measurement section is less than the width of the fluid passage at the ends of the tubular body, but the cross-sectional area of the fluid passage in the measurement section is the same as the cross-sectional area of the fluid passage at the ends of the tubular body.

19 Claims, 9 Drawing Sheets

(56) References Cited

U.S. PATENT DOCUMENTS

| | | | |
|---|---|---|---|
| 3,954,008 A | 5/1976 | Yamamoto et al. |
| 4,052,896 A | 10/1977 | Lee et al. |
| 4,095,457 A | 6/1978 | Koda et al. |
| 4,103,551 A | 8/1978 | Lynnworth |
| 4,300,401 A | 11/1981 | Pedersen |
| 4,312,239 A | 1/1982 | Zalessky et al. |
| 4,331,025 A | 5/1982 | Ord, Jr. |
| 4,409,847 A | 10/1983 | Magori |
| 4,480,486 A | 11/1984 | Meisser et al. |
| 4,576,047 A | 3/1986 | Lauer et al. |
| 4,633,719 A | 1/1987 | Vander Heyden |
| 5,105,666 A | 4/1992 | Steinacher |
| 5,117,698 A | 6/1992 | Baumoel |
| 5,277,070 A | 1/1994 | Dorr |
| 5,512,247 A | 4/1996 | Bonacina et al. |
| 5,602,343 A | 2/1997 | Franklin |
| 5,796,009 A | 8/1998 | Delsing |
| 6,098,467 A | 8/2000 | Wallen |
| 6,487,916 B1 | 12/2002 | Gomm et al. |
| 6,532,828 B1 | 3/2003 | Delsing |
| 6,629,467 B1 | 10/2003 | Lindahl |
| 6,632,014 B2 | 10/2003 | Steinberg et al. |
| 6,634,239 B2 | 10/2003 | Gomm et al. |
| 6,725,878 B1 | 4/2004 | Nawa et al. |
| 6,796,189 B1 | 9/2004 | Umekage et al. |
| 6,802,223 B2 * | 10/2004 | Nakatani ................ G01F 1/586 73/861.12 |
| 6,925,891 B2 | 8/2005 | Suginouchi et al. |
| 6,941,821 B2 | 9/2005 | Umekage et al. |
| 7,287,435 B2 * | 10/2007 | Ketelsen ................ G01F 1/588 73/861.12 |
| 7,360,448 B2 | 4/2008 | Maginnis et al. |
| 7,366,057 B2 | 4/2008 | Gaugler et al. |
| 7,509,880 B2 | 3/2009 | Kurz |
| 7,647,840 B2 | 1/2010 | Rickli |
| 7,775,125 B2 | 8/2010 | Rhodes |
| 7,810,401 B2 | 10/2010 | Brown et al. |
| 7,823,463 B1 | 11/2010 | Feller |
| 7,845,240 B1 | 12/2010 | Stehouwer |
| 7,870,793 B1 | 1/2011 | Feller |
| 7,987,731 B2 | 8/2011 | Bessyo et al. |
| 8,091,435 B2 | 1/2012 | Will et al. |
| 8,397,762 B2 | 3/2013 | Masters et al. |
| 8,424,392 B2 | 4/2013 | Kroemer et al. |
| 8,443,842 B2 | 5/2013 | Sonnenberg |
| 8,578,971 B2 | 11/2013 | Brown et al. |
| 8,689,638 B2 | 4/2014 | Shen |
| 8,720,280 B2 | 5/2014 | Murakami |
| 8,806,957 B2 | 8/2014 | Laursen et al. |
| 8,904,881 B2 | 12/2014 | Sonnenberg et al. |
| 2005/0233468 A1 | 10/2005 | Warshawsky et al. |
| 2008/0034862 A1 | 2/2008 | Kurz |
| 2008/0271544 A1 | 11/2008 | Rickli |
| 2009/0223306 A1 | 9/2009 | Brown et al. |
| 2010/0193407 A1 | 8/2010 | Steinberg et al. |
| 2010/0288055 A1 | 11/2010 | Mueller et al. |
| 2010/0313675 A1 | 12/2010 | Goegge et al. |
| 2011/0005336 A1 | 1/2011 | Brown et al. |
| 2011/0009745 A1 | 1/2011 | Seifer et al. |
| 2011/0072910 A1 | 3/2011 | Hueftle et al. |
| 2011/0079090 A1 | 4/2011 | Kroemer et al. |
| 2011/0132103 A1 | 6/2011 | Gottlieb et al. |
| 2012/0272749 A1 | 11/2012 | Lang |
| 2013/0047743 A1 | 2/2013 | Sonnenberg et al. |
| 2013/0180342 A1 | 7/2013 | Shen |
| 2014/0083180 A1 | 3/2014 | Schaefer et al. |
| 2014/0083202 A1 | 3/2014 | Wiest et al. |
| 2014/0109688 A1 | 4/2014 | Ebihara |
| 2014/0137662 A1 | 5/2014 | Heinks et al. |
| 2014/0144247 A1 | 5/2014 | Wiest et al. |
| 2014/0174561 A1 | 6/2014 | Hagihara et al. |
| 2014/0216167 A1 | 8/2014 | Nielsen et al. |
| 2014/0238148 A1 | 8/2014 | Priyadarshana et al. |
| 2014/0260664 A1 | 9/2014 | Gledhill, III et al. |
| 2014/0318268 A1 | 10/2014 | Sorensen et al. |
| 2014/0338465 A1 | 11/2014 | Skallebaek et al. |

FOREIGN PATENT DOCUMENTS

| | | |
|---|---|---|
| DE | 19944411 A1 | 4/2001 |
| EP | 0681160 A1 | 11/1995 |
| EP | 2037231 A1 | 3/2009 |
| EP | 2270439 A1 | 1/2011 |
| EP | 2278281 A1 | 1/2011 |
| JP | 200577146 A | 3/2005 |

\* cited by examiner

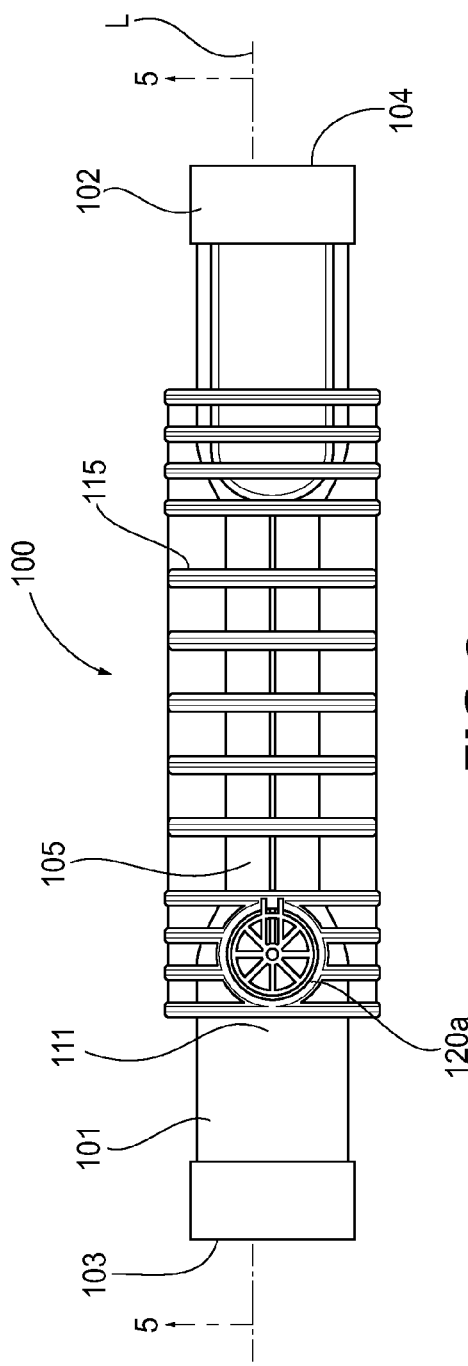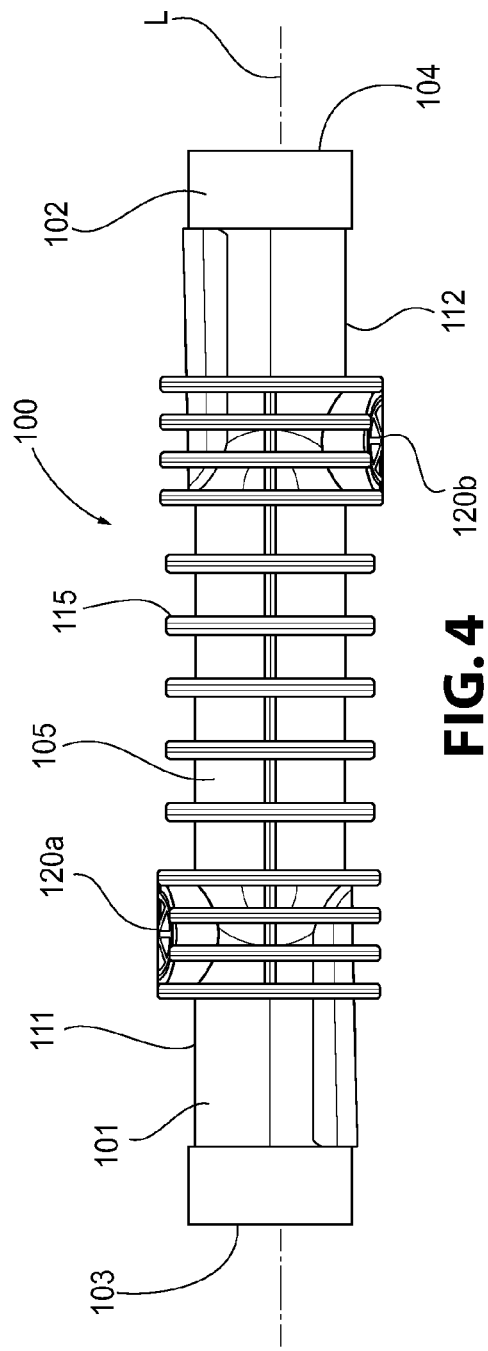

ULTRASONIC WATER METER

CROSS REFERENCE TO RELATED APPLICATIONS

The present application claims priority from U.S. Provisional Patent Application No. 62/107,797, filed on Jan. 26, 2015, and U.S. Provisional Patent Application No. 62/236,334, filed on Oct. 2, 2015, both of which are incorporated herein by reference in their entireties.

BACKGROUND OF THE INVENTION

Field of the Invention

The present disclosure relates, in general, to a water meter and, in particular, to an ultrasonic water meter used to determine a flow rate of a fluid moving through a piping arrangement.

Description of Related Art

A flow meter, such as a water meter, is a device used to measure the volume or flow rate of a fluid being moved through a piping arrangement. Water meters are typically used to measure the volume of water consumed by residential and commercial buildings that are supplied with water by a public water supply system. Water meters may also be used at the water source or at various locations throughout the water system in order to determine the flows and flow rates delivered through that portion of the system.

There are several types of water meters that are commonly used. Selection of the required water meter is based upon different flow measurement methods, the type of the end user, the required flow rates, as well as upon measurement accuracy requirements. One type of a water meter is an ultrasonic water meter that uses an ultrasonic transducer to send ultrasonic sound waves through the fluid to determine the fluid's velocity and translate the velocity into a measurement of the fluid volume.

There are several different configurations of ultrasonic water meters that are currently used. As shown in FIG. 1, an ultrasonic water meter 10 includes a piping arrangement 11 that houses at least two ultrasonic transducers 12a, 12b for emitting an ultrasonic sound wave. By determining the travel time and speed of the ultrasonic sound wave through the fluid flow of the piping arrangement 11, an operator may determine the flow rate of the fluid moving through the piping arrangement 11. The first transducer 12a emits the ultrasonic sound wave and the second transducer 12b receives the ultrasonic sound wave. The ultrasonic sound wave is directed laterally from the first transducer 12a to a first reflective surface 13a. The first reflective surface 13a directs the ultrasonic sound wave in a horizontal/longitudinal direction to a second reflective surface 13b. The second reflective surface 13b directs the ultrasonic sound wave laterally to the second transducer 12b. A travel path 14 of the ultrasonic sound wave is substantially "U-shaped". This ultrasonic water meter 10 is typically used in smaller residential settings. Since the ultrasonic water meter 10 utilizes a "U-shaped" travel path 14, both of the transducers 12a, 12b are positioned on the same side of the piping arrangement 11. Further, the reflective surfaces 13a, 13b are typically positioned in the center of the piping arrangement 11, which corresponds to the center of the flow. By positioning the reflective surfaces 13a, 13b in the center of the water flow, a high head loss is created in the water stream and an operator is unable to see through the interior of the piping arrangement 11 from an inlet end 15 to an outlet end 16.

As shown in FIG. 2, another ultrasonic water meter 20 includes a piping arrangement 21 that houses at least two ultrasonic transducers 22a, 22b for emitting an ultrasonic sound wave. This ultrasonic water meter 20 also provides the ultrasonic transducers 22a, 22b on the same side of the piping arrangement 21. This ultrasonic water meter 20, however, utilizes at least three reflective surfaces 23a, 23b, 23c to direct the ultrasonic sound wave through the piping arrangement 21. The first ultrasonic transducer 22a directs an ultrasonic sound wave laterally towards the first reflective surface 23a. The first reflective surface 23a directs the ultrasonic sound wave laterally at an angle towards the second reflective surface 23b. The second reflective surface 23b directs the ultrasonic sound wave laterally at an angle towards the third reflective surface 23c. The third reflective surface 23c directs the ultrasonic sound wave laterally towards the second ultrasonic transducer 22b. A travel path 24 of the ultrasonic sound wave is substantially "W-shaped". The ultrasonic water meter 20 utilizes a first and third reflective surface 23a, 23c that do not extend as far into the flow channel of the piping arrangement 21 as compared to the first and second reflective surfaces 13a, 13b of the ultrasonic water meter 10 of FIG. 1. Therefore, there is a reduction in head loss using this ultrasonic water meter 20 and an operator may be able to see through the interior of the piping arrangement 21 from an inlet end 25 to an outlet end 26. However, this ultrasonic water meter 20 requires the use of an additional reflective surface 23b to create the travel path 24 of the ultrasonic sound wave.

SUMMARY OF THE INVENTION

Accordingly, there is a general need in the art for an ultrasonic water meter that utilizes two reflective surfaces without creating an increase in head loss of the water flow through the ultrasonic water meter. A further need exists for an ultrasonic water meter that utilizes a different flow path for the ultrasonic sound wave through the piping arrangement to provide a more accurate reading of the flow rate of the water through the piping arrangement.

According to one aspect of the invention, an ultrasonic water meter and a method of measuring a flow rate of a liquid using the ultrasonic water meter are provided to address and/or overcome some or all of the deficiencies or drawbacks associated with existing ultrasonic water meters.

According to one particular embodiment, an ultrasonic flow meter device is provided. The device includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; at least two ultrasonic transducers disposed on opposing sides of the tubular body and spaced apart along the longitudinal axis; and at least two reflective elements disposed on the opposing sides of the tubular body and spaced apart along the longitudinal axis. The at least two ultrasonic transducers are configured to generate and/or receive an ultrasonic sound wave and the at least two reflective elements are configured to direct the ultrasonic sound wave through the fluid passage in the measurement section of the tubular body from one of the at least two ultrasonic transducers to another of the at least two ultrasonic transducers in a travel path that is substantially Z-shaped. The fluid passage includes an inlet defined at the first end of the tubular body and an outlet defined at the second end of the tubular body, the fluid passage having a first width at the inlet and the outlet and second width in the measurement section of the tubular body. The first width of the fluid passage is larger than the second width and a cross-sectional area of the fluid passage at the inlet and the outlet is the same as a cross-sectional area of the fluid passage in the measurement section.

The fluid passage may have a circular shape at the inlet and the outlet, and the fluid passage in the measurement section may have an oblong circular shape. The at least two ultrasonic transducers may be disposed at opposing ends of the measurement section. The at least two reflective elements may be disposed at opposing ends of the measurement section and may each be disposed on the tubular body opposite to a respective one of the at least two ultrasonic transducers. The at least two ultrasonic transducers may be disposed in recesses defined in the tubular body.

According to the embodiment, each of the at least two reflective elements may be disposed on a respective bracket inserted in the fluid passage. Each bracket is removably inserted in a slot defined in an interior surface of the tubular body and extending along the longitudinal axis from a respective one of the first end and the second end of the tubular body to the measurement section. Each bracket includes an inclined surface for holding the respective reflective element at an angle with respect to the longitudinal axis.

According to another particular embodiment of the invention, an ultrasonic flow meter device is provided. The device includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; at least two ultrasonic transducers disposed on opposing sides of the tubular body and spaced apart along the longitudinal axis; and at least two reflective elements disposed on the opposing sides of the tubular body and spaced apart along the longitudinal axis. Each of the at least two reflective elements is disposed on a respective bracket removably inserted in a slot defined in an interior surface of the tubular body and extending along the longitudinal axis from a respective one of the first end and the second end of the tubular body to the measurement section. The at least two ultrasonic transducers are configured to generate and/or receive an ultrasonic sound wave and the at least two reflective elements are configured to direct the ultrasonic sound wave through the measurement section of the tubular body from one of the at least two ultrasonic transducers to another of the at least two ultrasonic transducers.

The at least two reflective elements may be configured to direct the ultrasonic sound wave in a travel path that is substantially Z-shaped. The fluid passage may include an inlet defined at the first end of the tubular body and an outlet defined at the second end of the tubular body, the fluid passage having a first width at the inlet and the outlet and second width in the measurement section of the tubular body, the first width of the fluid passage being larger than the second width. The fluid passage may have a circular shape at the inlet and the outlet, and the fluid passage in the measurement section may have an oblong circular shape. The fluid passage may have a constant cross-sectional area from the inlet, through the measurement section, and to the outlet.

The at least two ultrasonic transducers may be disposed at opposing ends of the measurement section and the at least two reflective elements may be disposed at opposing ends of the measurement section, with each reflective element being disposed on the tubular body opposite to a respective one of the at least two ultrasonic transducers. The at least two ultrasonic transducers may be disposed in recesses defined in the tubular body. Each bracket may include an inclined surface for holding the respective reflective element at an angle with respect to the longitudinal axis.

According to another particular embodiment, a method of measuring a flow rate of a liquid through a flow meter device is provided. The method includes providing a flow meter device that includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; two ultrasonic transducers disposed on opposing sides of the tubular body and spaced apart along the longitudinal axis; and at least two reflective elements disposed on the opposing sides of the tubular body and spaced apart along the longitudinal axis. The fluid passage includes an inlet defined at the first end of the tubular body and an outlet defined at the second end of the tubular body, the fluid passage having a first width at the inlet and the outlet, and a second width in the measurement section of the tubular body. The first width of the fluid passage is larger than the second width and a cross-sectional area of the fluid passage at the inlet and the outlet is the same as a cross-sectional area of the fluid passage in the measurement section. The method further includes creating a flow of liquid through the piping arrangement; generating an ultrasonic sound wave with one of the two ultrasonic transducers; directing the ultrasonic sound wave with the at least two reflective elements along a travel path through the fluid passage in the measurement section of the tubular body from the ultrasonic transducer generating the ultrasonic sound wave to the other ultrasonic transducer, the travel path being substantially Z-shaped; receiving the ultrasonic sound wave at the other ultrasonic transducer; measuring a speed of the ultrasonic sound wave through the measurement section; and calculating the flow rate of the liquid based on the measured speed of the ultrasonic sound wave.

According to another particular embodiment, a flow meter device for measuring a flow rate of a liquid is provided. The device includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; two ultrasonic transducers disposed on opposing sides of the tubular body and spaced apart along the longitudinal axis; and at least two reflective elements disposed on the opposing sides of the tubular body and spaced apart along the longitudinal axis. The fluid passage includes an inlet defined at the first end of the tubular body and an outlet defined at the second end of the tubular body, the fluid passage having a first width at the inlet and the outlet and a second width in the measurement section of the tubular body. The first width of the fluid passage is larger than the second width and a cross-sectional area of the fluid passage at the inlet and the outlet is the same as a cross-sectional area of the fluid passage in the measurement section. The fluid passage is configured to accommodate a flow of the liquid through the piping arrangement. One of the ultrasonic transducers generates an ultrasonic sound wave. The at least two reflective elements direct the ultrasonic sound wave along a travel path through the fluid passage in the measurement section of the tubular body from the ultrasonic transducer generating the ultrasonic sound wave to the other ultrasonic transducer, the travel path being substantially Z-shaped. The other ultrasonic transducer receives the ultrasonic sound wave. The device further includes means for measuring a speed of the ultrasonic sound wave through the measurement section and means calculating the flow rate of the liquid based on the measured speed of the ultrasonic sound wave.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 3 is a side view of an ultrasonic flow meter in accordance with an embodiment of the present invention;

FIG. 4 is a top view of the ultrasonic flow meter of FIG. 3;

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
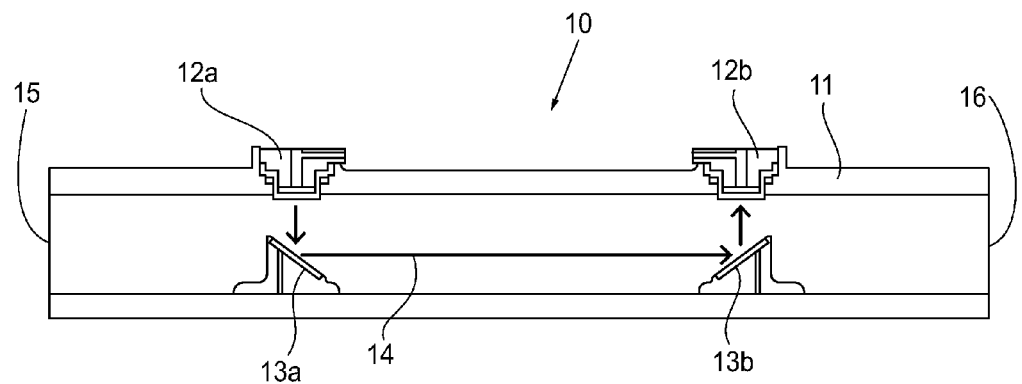
FIG. 1 is a schematic cross-sectional view of an example of an ultrasonic water meter according to the prior art.
Figure 2:
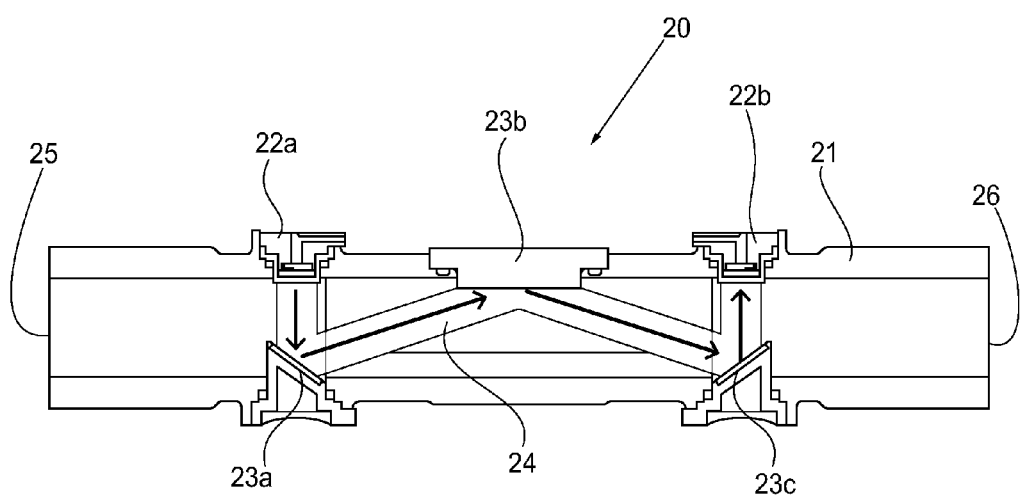
FIG. 2 is a schematic cross-sectional view of another example of an ultrasonic water meter according to the prior art.
Figure 5:
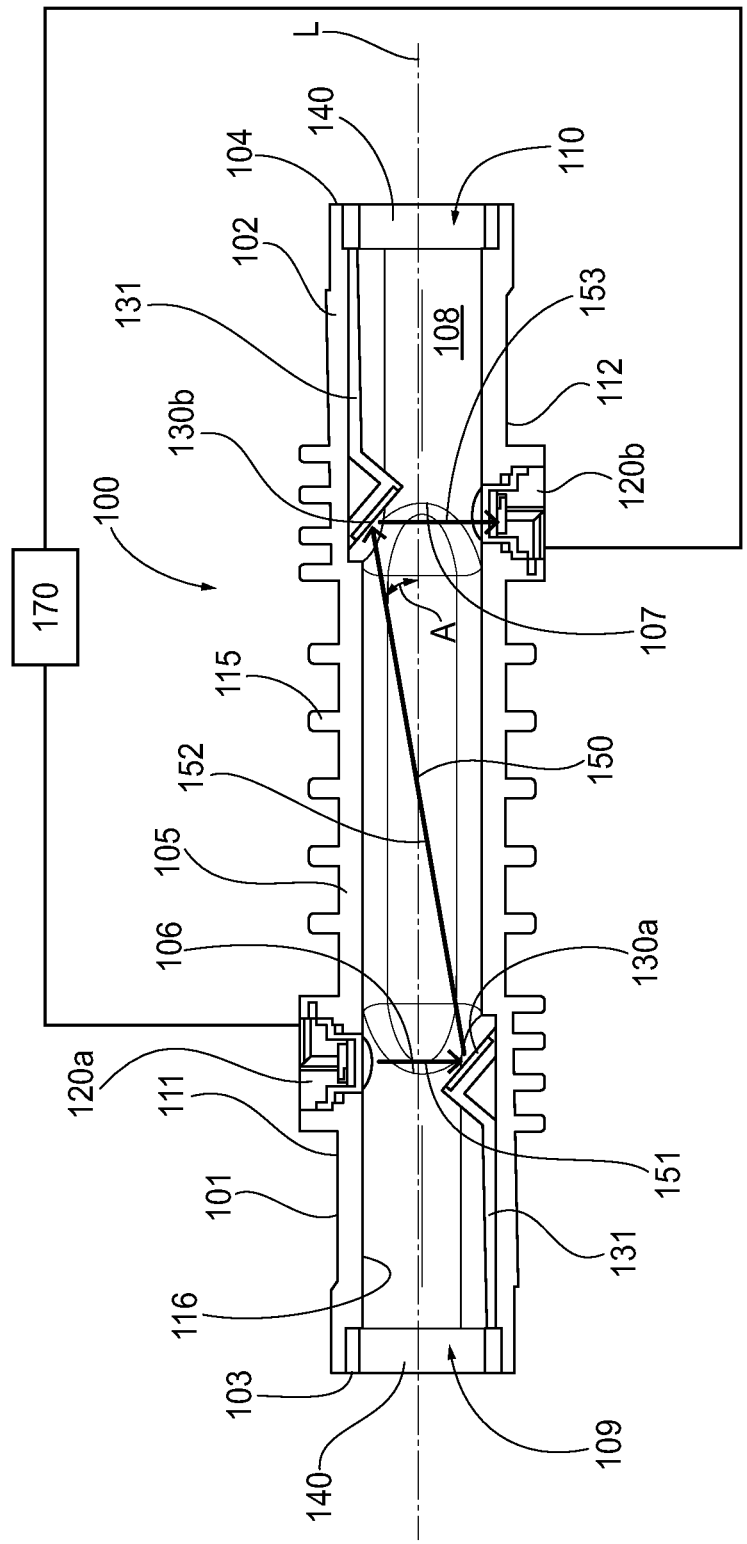
FIG. 5 is a cross-sectional view of the ultrasonic flow meter of FIG. 3 taken along lines 5-5 shown in FIG. 3.
Figure 6:
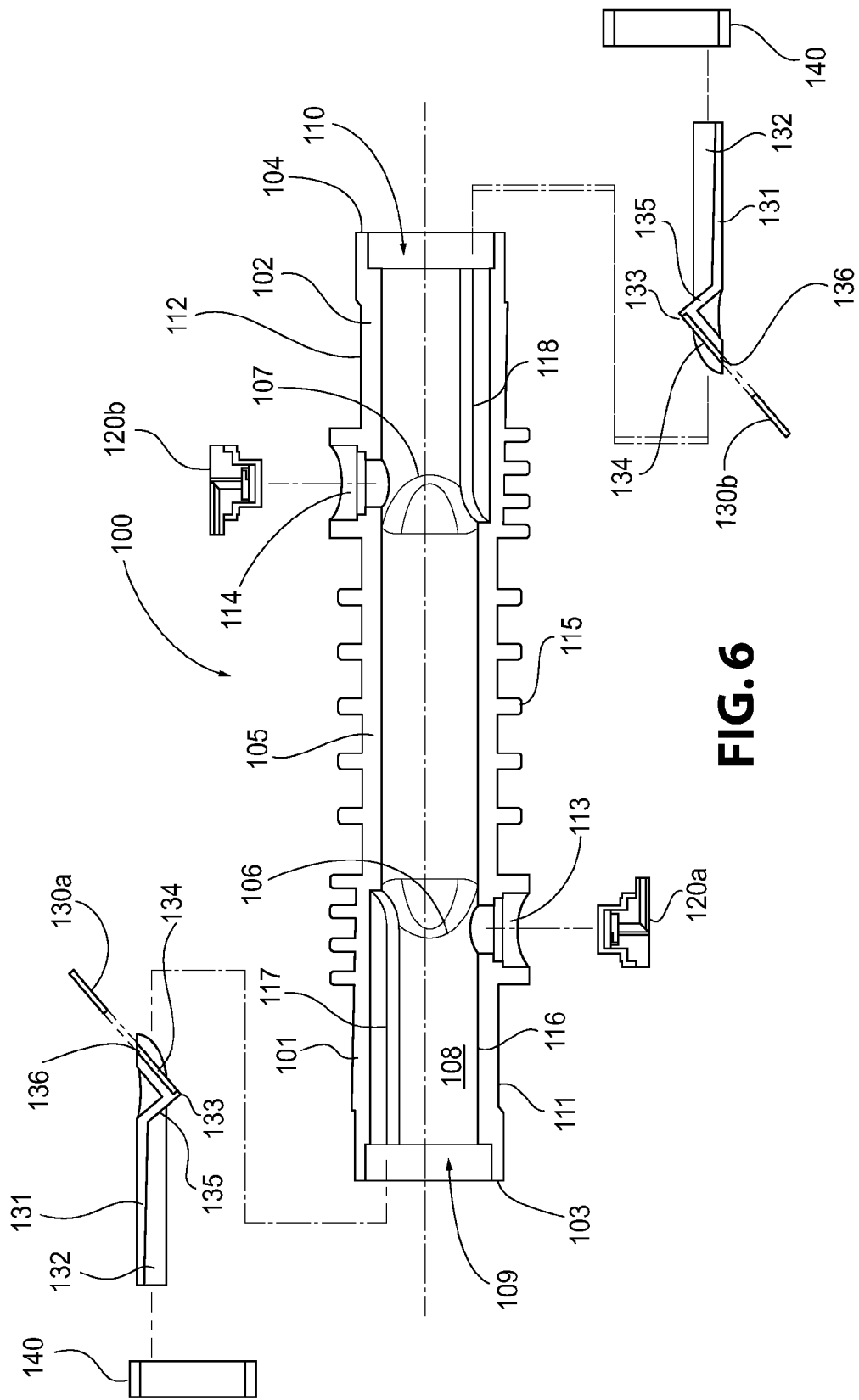
FIG. 6 is an exploded cross-sectional view of the ultrasonic flow meter of FIG. 3.
Figure 7:
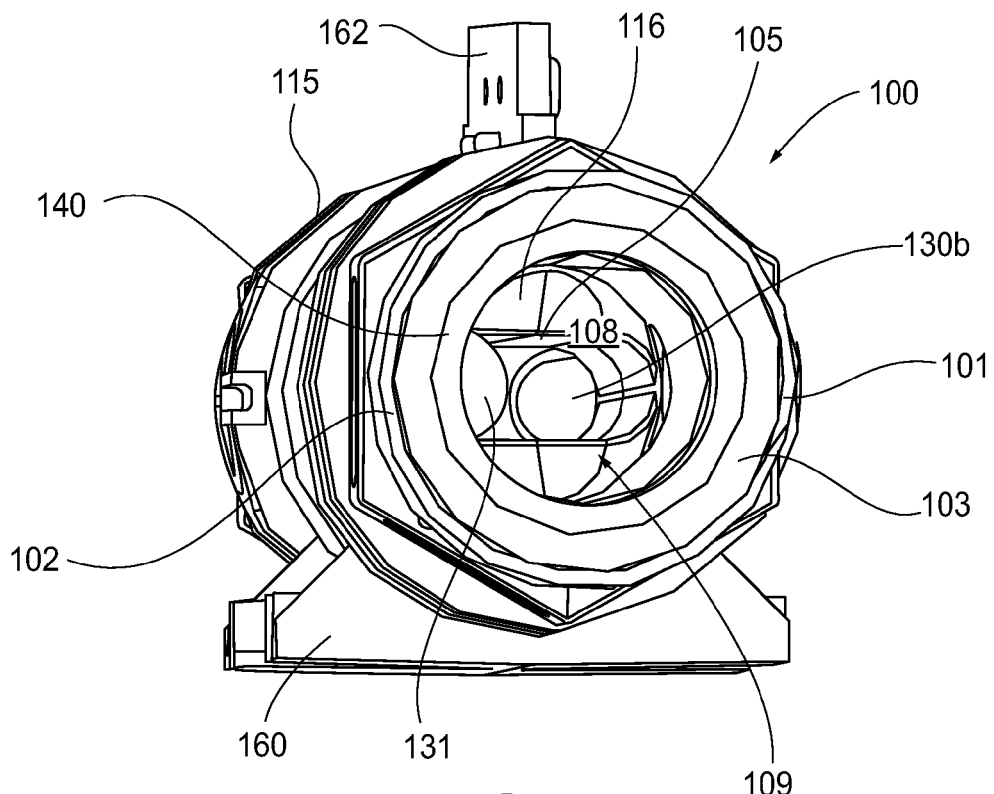
FIG. 7 is a perspective view of the ultrasonic flow meter of FIG. 3.
Figure 8:
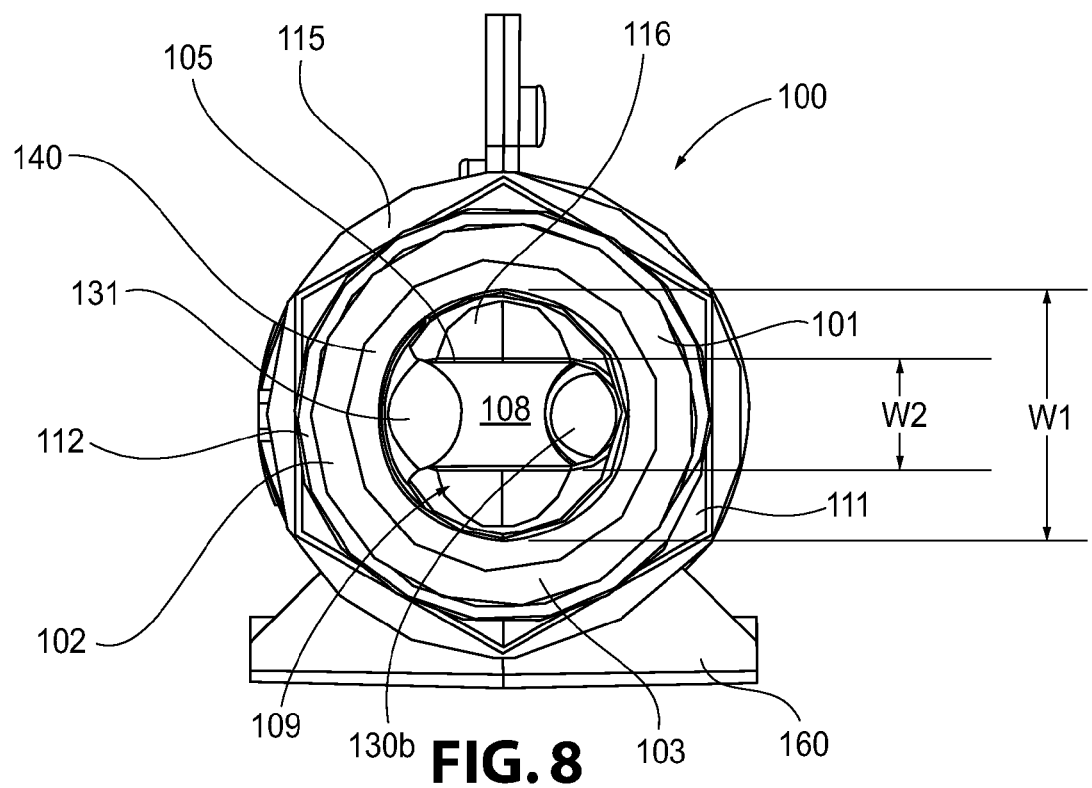
FIG. 8 is a front view of the ultrasonic flow meter of FIG. 3.

With reference to FIGS. 3-8, an ultrasonic flow meter device 100 is shown in accordance with an embodiment of the present invention. The ultrasonic flow meter device 100 may be utilized for a variety of purposes, including for determining a flow rate and/or volume of a liquid, such as water, passing through the ultrasonic flow meter 100 in a piping system. The device 100 includes a piping arrangement 101 having a tubular body 102 extending along a longitudinal axis L from a first end 103 to a second end 104. The tubular body 102 includes a measurement section 105 disposed within the tubular body 102 intermediate of the first end 103 and the second end 104. The tubular body 102 defines a fluid passage 108 extending along the longitudinal axis L through the tubular body 102 from the first end 103 to the second end 104. The device 100 also includes two ultrasonic transducers 120a, 120b, which are spaced apart along the longitudinal axis L, disposed on opposing sides 111, 112 of the tubular body 102. The device 100 further includes two reflective elements 130a, 130b, which are spaced apart along the longitudinal axis L, disposed on the opposing sides 111, 112 of the tubular body 102. With reference to FIGS. 7 and 8, the piping arrangement 101 may include a base 160 extending from the lower side of the tubular body 102, which is configured to support the piping arrangement 101 on a ground surface. The piping arrangement 101 may also include a bracket 162 extending from the upper side of the tubular body 102. The bracket 162 is configured to support an ancillary device, such as a register 170 (shown in FIG. 5) or an antenna, on the piping arrangement 101.

As shown in FIGS. 3-8, a plurality of fins 115 extend from and around the outer circumferential surface of the tubular body 102. The fins 115 may extend around the entire outer circumferential surface of the tubular body 102. The fins 115 may also only extend around a portion of the outer circumferential surface of the tubular body 102. In one aspect, the fins 115 may be defined as protruding members extending from the outer surface of the tubular body 102. The fins 115 are configured to minimize the expansion of the tubular body 102 due to any increases in temperature or pressure in the fluid passage 108 through the tubular body 102. The fins 115 are also configured to maintain the inner diameter of an interior surface 116 of the tubular body 102.

As shown in FIG. 5, the two ultrasonic transducers 120a, 120b generate and receive, respectively, an ultrasonic sound wave. The two reflective elements 130a, 130b direct the ultrasonic sound wave through the fluid passage 108 in the measurement section 105 of the tubular body 102 from one of the ultrasonic transducers 120a to the other of the ultrasonic transducers 120b in a travel path 150 that is substantially Z-shaped.

In particular, the ultrasonic transducers 120a, 120b are configured to emit an ultrasonic sound wave through the tubular body 102 and to receive the ultrasonic sound wave that is emitted. One ultrasonic transducer 120a may be specifically configured as a transmitter to emit the ultrasonic sound wave, while the other 120b may be specifically configured as a sensor or receiver to receive the ultrasonic sound wave. Alternatively, both ultrasonic transducers 120a, 120b may be configured as transceivers capable of both transmitting and receiving an ultrasonic sound wave. The two reflective elements 130a, 130b are made of a metal material or are coated with a metal or otherwise reflective surface that renders the reflective elements 130a, 130b suitable for reflecting an ultrasonic sound wave.

In particular, as shown in FIG. 5, the two ultrasonic transducers 120a, 120b are disposed at opposing ends 106, 107 of the measurement section 105 on opposing sides 111, 112 of the tubular body 102. In particular, as shown in FIG. 6, the two ultrasonic transducers 120a, 120b are disposed in respective recesses 113, 114 formed in the opposing sides 111, 112 of the tubular body 102. The ultrasonic transducers 120a, 120b and the recesses 113, 114 are configured such that the transducers 120a, 120b extend into the fluid passage 108 by a minimal amount so as to minimize the head loss/disruption of flow through the fluid passage 108 caused by the presence of the ultrasonic transducers 120a, 120b. Similarly, the two reflective elements 130a, 130b are also disposed at the opposing ends 106, 107 of the measurement section 105 and on opposing sides 111, 112 of the tubular body 102. The reflective elements 130a, 130b are disposed on the tubular body 102 opposite to a respective one of the two ultrasonic transducers 120a, 120b. In particular, the reflective elements 130a, 130b may be substantially aligned with respective ultrasonic transducers 120a, 120b such that the entire ultrasonic sound wave emitted from the ultrasonic transducers 120a, 120b may be received by the reflective elements 130a, 130b, thereby providing a more accurate reading of the travel path 150 of the ultrasonic sound wave through the tubular body 102.

As such, the travel path 150 of the ultrasonic sound wave through the measurement section 105 includes a first segment 151 extending laterally across the measurement section 105 from the first ultrasonic transducer 120a to the first reflective element 130a, a second segment 152 extending laterally and longitudinally at an angle A with respect to the longitudinal axis L from the first reflective element 130a to the second reflective element 130b, which is disposed on the opposite end 107 of the measurement section 105 and on an opposite side 111 of the tubular body 102 from the first reflective element 130a, and a third segment 153 extending laterally across the measurement section 105 from the second reflective element 130b to the second ultrasonic transducer 120b. According to the embodiment shown, the angle A of the second segment 152 of the travel path 150 with respect to the longitudinal axis L is approximately 9°.

This travel path 150 is directed in the same direction as the flow of liquid through the ultrasonic flow meter 100. The travel path 150 could be directed in an opposite direction to calculate the flow rate of the reverse backflow of water through the ultrasonic flow meter 100. In this aspect, the second ultrasonic transducer 120b would emit and direct laterally an ultrasonic sound wave towards the second reflective element 130b. The second reflective element 130b may direct the ultrasonic sound wave at the angle A across the fluid passage 108 of the tubular body 102 towards the first reflective element 130a. The first reflective element 130a may then direct the ultrasonic sound wave laterally towards the first ultrasonic transducer 120a.

It is to be appreciated however, that this angle A may be adjusted based on several factors, including the desired length of the measurement section 105, and, thus, may be of any value known to be suitable to one having ordinary skill in the art. It is also to be appreciated that the exact configuration of the ultrasonic transducers 120a, 120b and the reflective elements 130a, 130b may be adjusted in order to alter the exact shape of the travel path 150. For instance, the reflective elements 130a, 130b need not be precisely aligned with the respective ultrasonic transducers 120a, 120b in the longitudinal direction and may instead be spaced from the transducers 120a, 120b in the longitudinal direction. Accordingly, the term "substantially" as used herein is used to encompass slight variations in the shape of the travel path 150 including the above-described precise Z-shape. It is also to be appreciated that additional ultrasonic transducers and/or reflective elements may be provided to the extent known to be suitable to one having ordinary skill in the art for achieving the above-described travel path 150.

The amount of time it takes for the ultrasonic sound wave to move through the liquid that flows through the ultrasonic flow meter 100 may be determined using the ultrasonic transducers 120a, 120b. The ultrasonic transducers 120a, 120b may measure the average time it takes for the ultrasonic sound wave to move through the measurement section 105 of the tubular body 102. The velocity of the liquid flowing through the ultrasonic flow meter 100 may be determined by dividing the measured distance of the travel path 150 of the ultrasonic sound wave by the measured transit time between the pulses of ultrasonic sound waves propagating into and against the direction of liquid flow. Using the calculated velocity, the flow rate of the liquid through the measurement section 105 may be determined.

The ultrasonic flow meter 100, shown in FIGS. 3-8, may have a high beam or sound wave efficiency due to several reasons regarding the arrangement of the ultrasonic flow meter 100. Since the ultrasonic flow meter 100 uses two reflective elements 130a, 130b, instead of three reflective elements, there is minimal acoustic damping of the ultrasonic sound waves through the measurement section 105. During operation of the ultrasonic flow meter 10, the ultrasonic sound wave emitted from the ultrasonic transducers 120a, 120b may experience acoustic damping when directed against a reflective element 130a, 130b. Due to the acoustic damping, the ultrasonic sound wave may become weaker as the ultrasonic sound wave moves along the travel path 150, thereby affecting the measurements of the ultrasonic transducers 120a, 120b. Therefore, the fewer reflective surfaces 130a, 130b that are used, the stronger the ultrasonic sound wave may remain, thereby providing a more accurate reading regarding the time taken to move through the ultrasonic flow meter 100.

The ultrasonic flow meter 100 may also have a high beam or sound wave efficiency since the ultrasonic sound wave covers the entire flow section. As shown in FIG. 5, the first reflective element 130a directs the ultrasonic sound wave laterally and longitudinally at an angle A towards the second reflective element 130b. Therefore, the entire second segment 152 of the travel path 150 of the ultrasonic sound wave is directed within a restricted cross section of the ultrasonic flow meter 100. As shown with angle A in FIG. 5, the ultrasonic sound wave is diverted approximately nine (9) degrees from the longitudinal axis L and the flow direction. In one aspect, the ultrasonic sound wave travels substantially parallel with the flow of water through the tubular body 102. Since the ultrasonic sound wave is offset from the cross flow of the water by this smaller angle, a more accurate and extended measurement of the velocity profile of the ultrasonic sound wave through the measurement section may be obtained by the ultrasonic transducers 120a, 120b. Further, by positioning the second segment 152 of the travel path 150 of the ultrasonic sound wave along the longitudinal axis L of the fluid passage 108 through the middle of the tubular body 102, it ensures that the ultrasonic transducers 120a, 120b are always wet. To obtain an accurate reading along the travel path 150 of the ultrasonic sound wave, the ultrasonic transducers 120a, 120b and the reflective elements 130a, 130b should remain wet to ensure that the ultrasonic sound wave travels through the same medium throughout the entire travel path 150. It is undesirable to have the ultrasonic sound wave travel through air trapped in the tubular body 102, which may occur on the surfaces of the ultrasonic transducers 120a, 120b or the reflective elements 130a, 130b. Similarly, the travel path 150 of the ultrasonic sound wave is configured to move along the center line of the longitudinal axis L of the tubular body 102 so the ultrasonic sound wave does not travel through any air bubbles that are trapped in the piping arrangement 101.

A register 170 operatively connected to the ultrasonic transducers 120a, 120b, as shown in FIG. 5, may be provided to operate the ultrasonic transducers 120a, 120b to emit and receive an ultrasonic sound wave. The register 170 may incorporate a controller microprocessor configured to transmit commands to the ultrasonic transducers 120a, 120b to emit and receive an ultrasonic wave. The controller within the register 170 may also receive signals from the ultrasonic transducers 120a, 120b indicating that an ultrasonic sound wave has been transmitted and received. The controller within the register 170 may also be programmed to act as means for measuring the speed of the ultrasonic sound wave through the measurement section 105 and also for calculating the flow rate of the liquid flowing through the piping arrangement 101 based on the measured speed of the ultrasonic sound wave. The register 170 may also incorporate a power source, such as a battery, for powering the controller and for powering the ultrasonic transducers 120a, 120b. Alternatively, the ultrasonic transducers 120a, 120b may be in communication with a remote register via an antenna mounted on the tubular body 102. The antenna may transmit information to the receiver via a low power radio signal, or via BLUETOOTH® or similar low power communications protocol, or via a Wi-Fi connection. Alternatively, the ultrasonic transducers 120a, 120b may be in communication with the remote register via a capacitive link. In the case that the register is provided remotely, the power source may be incorporated directly in or on the tubular body 102.

As shown in FIGS. 3-8, the fluid passage 108 includes an inlet 109 defined at the first end 103 of the tubular body 102 and an outlet 110 defined at the second end 104 of the tubular body 102. As shown in FIG. 8, the fluid passage 108 has a first width W1 at the inlet 109 and the outlet 110, and a second width W2 in the measurement section 105 of the tubular body 102. The first width W1 of the fluid passage 108 at the inlet 109 and the outlet 110 is larger than the second width W2 of the fluid passage 108 through the measurement section 105. In particular, as shown in FIGS. 3 and 8, the fluid passage 108 has a circular cross-sectional shape at the inlet 109 and the outlet 110, and an oval or oblong circular shape in the measurement section 105. The interior surface 116 of the tubular body 102 is sloped at the first end 106 and the second end 107 of the measurement section 105 where the fluid passage 108 transitions between the circular and oblong circular shapes.

A cross-sectional area of the fluid passage 108 is the same throughout the entire length of the tubular body 102 along the longitudinal axis L, including at the inlet 109 and the outlet 110 and through the measurement section 105. The reduction in width of the fluid passage 108 in the measurement section 105 allows for a more uniform flow of liquid through the measurement section 105 and alleviates swirling and eddying of the flow through the measurement section, which may disrupt transmission of the ultrasonic sound wave. The cross-sectional area of the fluid passage 108 is maintained along its entire longitudinal length, including through the measurement section 105, in order to avoid changing the flow rate of the liquid (speeding up and slowing down) as the liquid enters and leaves the measurement section 105.

In particular, the measurement section 105 is configured to create an elliptical flow of liquid through the tubular body 102 in the measurement section 105. The elliptical liquid flow may move from the top of the tubular body 102 to the bottom of the tubular body 102, instead of side to side in the tubular body 102. The cross section of the fluid passage 108 through the measurement section 105 broadens laterally between the opposing sides 111, 112 of the tubular body 102. The elliptical water flow provides a more accurate measurement of the time it takes for the ultrasonic sound wave to travel through the measurement section 105 because a substantial amount of the water flow is moving along the travel path 150 of the ultrasonic sound wave. During operation of the ultrasonic flow meter 100, the liquid flow may become turbulent moving through the tubular body 102. Due to this turbulence in the water, air bubbles may be created, which float to the top of the tubular body 102. By using an elliptical water flow, however, any bubbles created by turbulent flow of the water may be directed to the top of the tubular body 102, instead of the sides 111, 112 of the tubular body 102 that hold the reflective elements 130a, 130b and ultrasonic transducers 120a, 120b.

With reference to FIGS. 5 and 6, the two reflective elements 130a, 130b are each disposed on a respective bracket 131 inserted into the fluid passage 108 from a respective end 103, 104 of the tubular body 102. Each bracket 131 is removably inserted in a respective slot 117, 118 defined in the interior surface 116 of the tubular body 102 and extending along the longitudinal axis L from a respective one of the first end 103 and second end 104 of the tubular body 102 to the measurement section 105. Each bracket 131 includes a body portion 132 that is slidable into the respective slots 117, 118 and an inclined portion 133 that holds one of the reflective elements 130a, 130b such that the reflective elements 130a, 130b may extend into the fluid passage 108 of the tubular body 102.

The reflective elements 130a, 130b do not extend so far into the fluid passage 108 as to block the fluid passage 108. The reflective elements 130a, 130b are suitably arranged and positioned so as to minimize the area of the fluid passage 108 that is blocked by the reflective elements 130a, 130b. By minimizing the area of the fluid passage 108 that is blocked by the reflective elements 130a, 130b, a more uniform flow of fluid may pass through the ultrasonic flow meter 100.

The inclined portion 133 of each bracket 131 defines an inclined surface 134 that holds the respective reflective element 130a, 130b at an angle with respect to the longitudinal axis L that is appropriate for directing the ultrasonic sound beam along the substantially Z-shaped travel path 150, as discussed above. The respective reflective element 130a, 130b is assembled on the bracket 131 by sliding the reflective element 130a, 130b through a slot 136 defined in the bottom of the body portion 132 of the bracket 131 at the base of the inclined portion 133 leading to the inclined surface 134. Alternatively, the reflective elements 130a, 130b may be secured to the respective inclined surface 134 by an adhesive or may be molded into the respective bracket 131.

The inclined portion 133 of each bracket 131 also defines an opposing inclined surface 135 that is angled and shaped to minimize the head loss created by the inclined portion 133 extending into the fluid passage 108 of the tubular body 102. In particular, the opposing inclined surface 135 of the bracket 131 is configured to minimize the area of the fluid passage 108 that is blocked and maintain a more uniform flow through the fluid passage 108.

Each bracket 131 is held in place within the respective slot 117, 118 by forming a friction fit with the slot 117, 118 to allow for easy installation and removal of the brackets 131 from the tubular body 102. End rings 140 are also inserted into each of the ends 103, 104 of the tubular body 102 to assist in retaining the brackets 131 in place in the tubular body 102. The interior surface 116 of the tubular body 102 is partially recessed at the ends 103, 104 in order to form a shoulder within the internal diameter of the tubular body 102 at each of the ends 103, 104 for receiving the end rings 140.

It is to be appreciated that the reflective elements 130a, 130b may be assembled into the piping arrangement 101 via other techniques, such as being inserted through slots in the tubular body 102 or by being assembled onto bodies inserted into recesses defined in the tubular body 102, or according to any other assembly technique found to be suitable by those having ordinary skill in the art.

Figure 9:
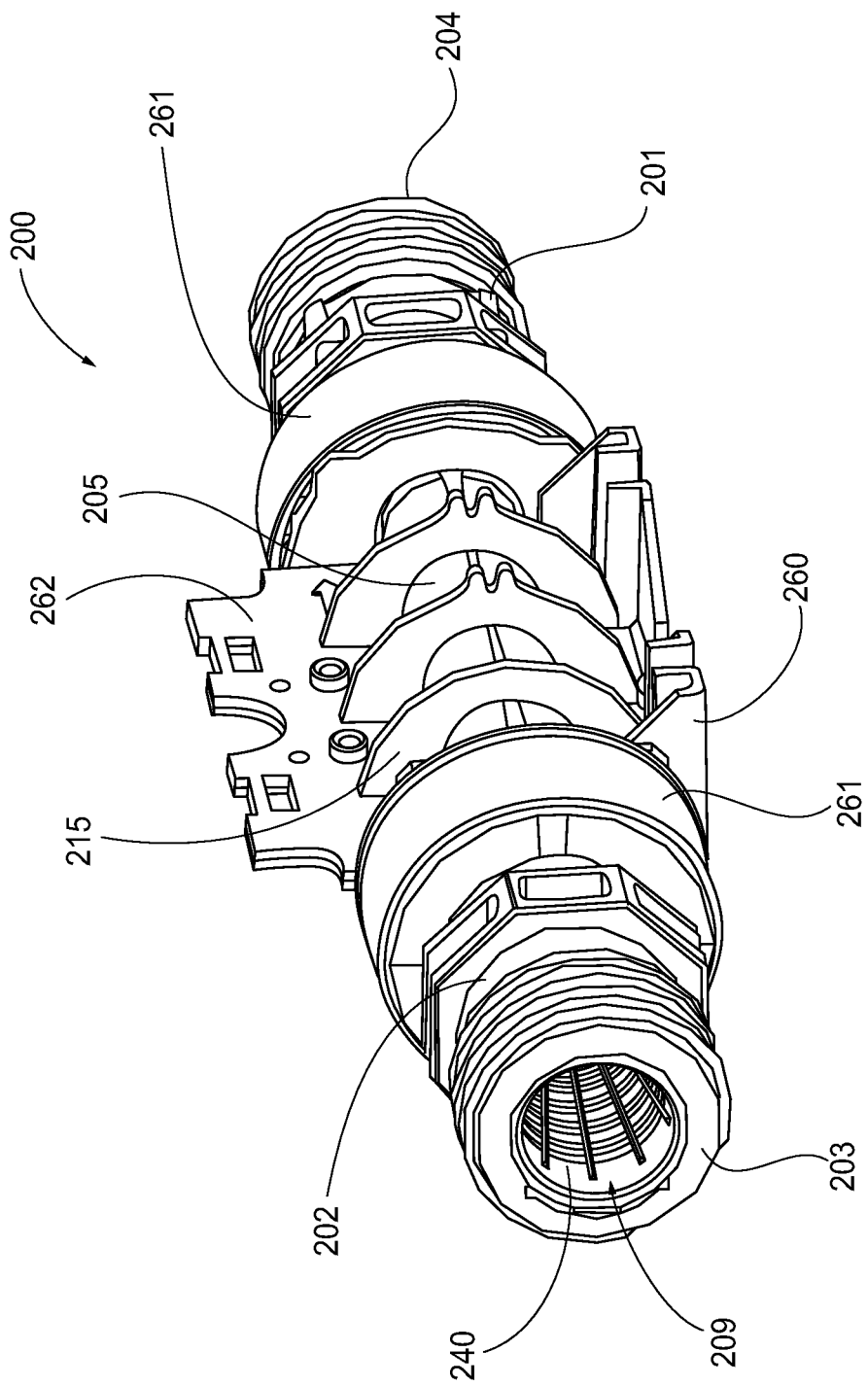
FIG. 9 is a perspective view of an ultrasonic flow meter in accordance with another embodiment of the present invention.
Figure 10:
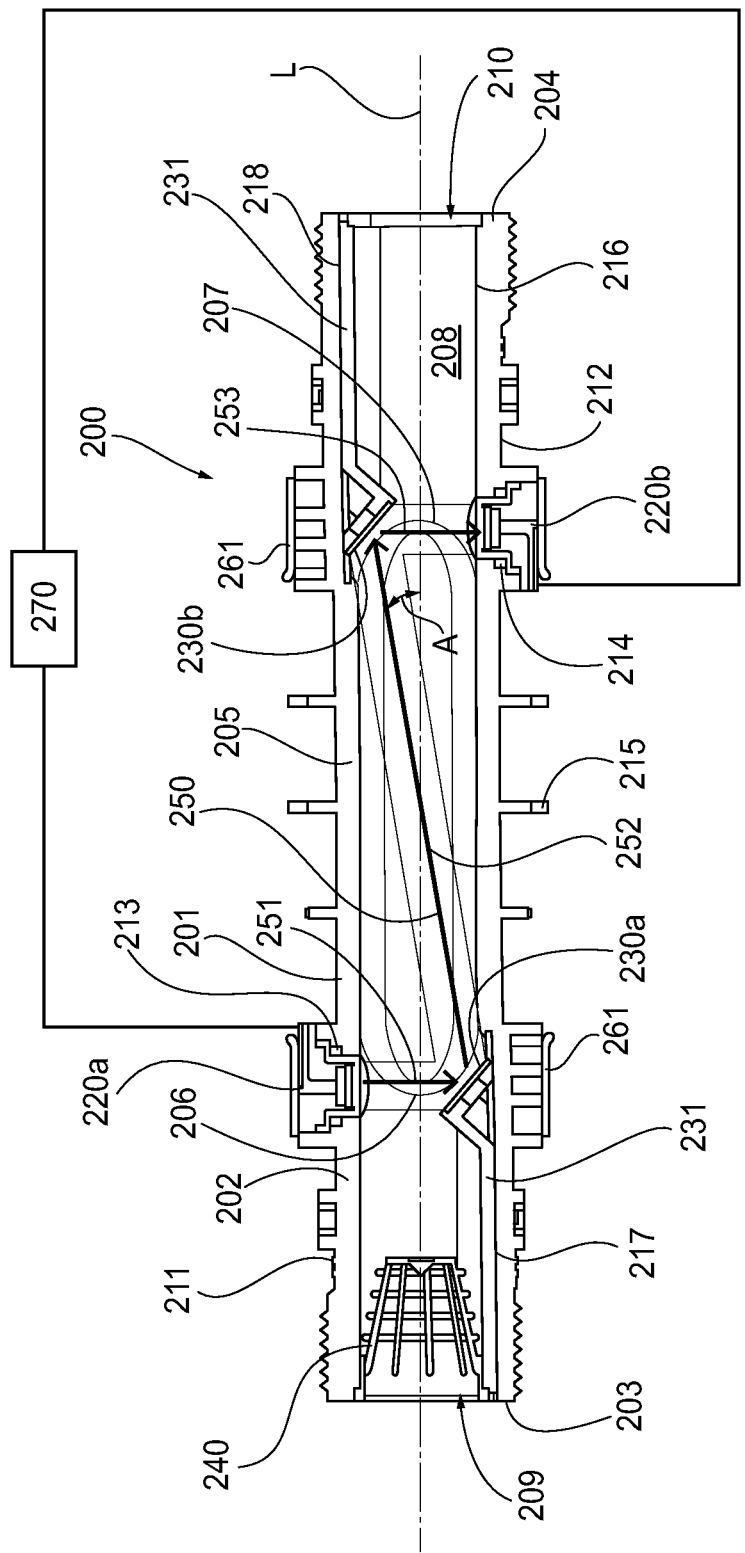
FIG. 10 is a cross-sectional view of the ultrasonic flow meter of FIG. 9.

With reference to FIGS. 9 and 10, an ultrasonic flow meter 200 is shown in accordance with another embodiment of the invention. The ultrasonic flow meter 200, shown in FIGS. 9 and 10, is substantially similar to the ultrasonic flow meter 100 discussed above with reference to FIGS. 3-8 except as to certain aspects, which will be discussed in additional detail below. Accordingly, the above-discussed aspects of the ultrasonic flow meter 100 shown in FIGS. 3-8 should be considered as being applicable to the ultrasonic flow meter 200 shown in FIGS. 9 and 10, and vice versa, unless explicitly stated otherwise.

As shown in FIG. 9, the ultrasonic flow meter 200 includes a piping arrangement 201 having a tubular body 202 extending along a longitudinal axis L from a first end 203 to a second end 204. The tubular body 202 includes a measurement section 205 disposed within the tubular body 202 intermediate of the first end 203 and the second end 204. The tubular body 202 defines a fluid passage 208 extending along the longitudinal axis L through the tubular body 202 from the first end 203 to the second end 204. The device 200 also includes two ultrasonic transducers 220a, 220b, which are spaced apart along the longitudinal axis L, disposed on opposing sides 211, 212 of the tubular body 202. The device 200 further includes two reflective elements 230a, 230b, which are spaced apart along the longitudinal axis L, disposed on the opposing sides 211, 212 of the tubular body 202. With reference to FIG. 9, the piping arrangement 201 may include a base 260 extending from the lower side of the tubular body 202, which is configured to support the piping arrangement 201 on a ground surface. A plurality of fins 215 for strength and rigidity extend from and around the outer circumferential surface of the tubular body 202. The piping arrangement 201 may also include a bracket 262 extending from the upper side of the tubular body 202. The bracket 262 is configured to support an ancillary device, such as a register 270 (shown in FIG. 10) or an antenna, on the piping arrangement 201.

As shown in FIG. 10, the two ultrasonic transducers 220a, 220b generate and receive, respectively, an ultrasonic sound wave. The two reflective elements 230a, 230b direct the ultrasonic sound wave through the fluid passage 208 in the measurement section 205 of the tubular body 202 from one of the ultrasonic transducers 220a to the other of the ultrasonic transducers 220b in a travel path 250 that is substantially Z-shaped.

In particular, the ultrasonic transducers 220a, 220b are configured to emit an ultrasonic sound wave through the tubular body 202 and to receive the ultrasonic sound wave that is emitted. One ultrasonic transducer 220a may be specifically configured as a transmitter to emit the ultrasonic sound wave, while the other 220b may be specifically configured as a sensor or receiver to receive the ultrasonic sound wave. Alternatively, both ultrasonic transducers 220a, 220b may be configured as transceivers capable of both transmitting and receiving an ultrasonic sound wave. The two reflective elements 230a, 230b are made of a metal material or are coated with a metal or otherwise reflective surface that renders the reflective elements 230a, 230b suitable for reflecting an ultrasonic sound wave.

In particular, as shown in FIG. 10, the two ultrasonic transducers 220a, 220b are disposed at opposing ends 206, 207 of the measurement section 205 on opposing sides 211, 212 of the tubular body 202. In particular, the two ultrasonic transducers 220a, 220b are disposed in respective recesses 213, 214 formed in the opposing sides 211, 212 of the tubular body 202. The two ultrasonic transducers may be retained in the respective recesses 213, 214 by bands 261 extending around the outer circumferential surface of the tubular body 202 over the ultrasonic transducers 220a, 220b, as shown in FIGS. 9 and 10. The bands 261 may also serve to protect the transducers 220a, 220b from environmental wear and damage.

The two reflective elements 230a, 230b are also disposed at the opposing ends 206, 207 of the measurement section 205 and on opposing sides 211, 212 of the tubular body 202. The reflective elements 230a, 230b are disposed on the tubular body 202 opposite to a respective one of the two ultrasonic transducers 220a, 220b. In particular, the reflective elements 230a, 230b may be substantially aligned with respective ultrasonic transducers 220a, 220b such that the entire ultrasonic sound wave emitted from the ultrasonic transducers 220a, 220b may be received by the reflective elements 230a, 230b, thereby providing a more accurate reading of the travel path 250 of the ultrasonic sound wave through the tubular body 202.

As such, the travel path 250 of the ultrasonic sound wave through the measurement section 205 includes a first segment 251 extending laterally across the measurement section 205 from the first ultrasonic transducer 220a to the first reflective element 230a, a second segment 252 extending laterally and longitudinally at an angle A with respect to the longitudinal axis L from the first reflective element 230a to the second reflective element 230b, which is disposed on the opposite end 207 of the measurement section 205 and on an opposite side 211 of the tubular body 202 from the first reflective element 230a, and a third segment 253 extending laterally across the measurement section 205 from the second reflective element 230b to the second ultrasonic transducer 220b. According to the embodiment shown, the angle A of the second segment 252 of the travel path 250 with respect to the longitudinal axis L is approximately 9°.

A register 270 operatively connected to the ultrasonic transducers 220a, 220b, as shown in FIG. 10, may be provided to operate the ultrasonic transducers 220a, 220b to emit and receive an ultrasonic sound wave. The register 270 may incorporate a controller microprocessor configured to transmit commands to the ultrasonic transducers 220a, 220b to emit and receive an ultrasonic wave. The controller within the register 270 may also receive signals from the ultrasonic transducers 220a, 220b indicating that an ultrasonic sound wave has been transmitted and received. The controller within the register 270 may also be programmed to act as means for measuring the speed of the ultrasonic sound wave through the measurement section 205 and also for calculating the flow rate of the liquid flowing through the piping arrangement 201 based on the measured speed of the ultrasonic sound wave. The register 270 may also incorporate a power source, such as a battery, for powering the controller and for powering the ultrasonic transducers 220a, 220b. Alternatively, the ultrasonic transducers 220a, 220b may be in communication with a remote register via an antenna mounted on the tubular body 202. The antenna may transmit information to the receiver via a low power radio signal, or via BLUETOOTH® or similar low power communications protocol, or via a Wi-Fi connection. Alternatively, the ultrasonic transducers 220a, 220b may be in communication with the remote register via a capacitive link. In the case that the register is provided remotely, the power source may be incorporated directly in or on the tubular body 202.

As shown in FIGS. 9 and 10, the fluid passage 208 includes an inlet 209 defined at the first end 203 of the tubular body 202 and an outlet 210 defined at the second end 204 of the tubular body 202. As discussed above with respect to the ultrasonic flow meter 100 as shown in FIG. 8, the fluid passage 208 has a first width at the inlet 209 and the outlet 210, and a second width in the measurement section 205 of the tubular body 202. The first width of the fluid passage 208 at the inlet 209 and the outlet 210 is larger than the second width of the fluid passage 208 through the measurement section 205. In particular, the fluid passage 208 has a circular cross-sectional shape at the inlet 209 and the outlet 210, and an oval or oblong circular shape in the measurement section 205. An interior surface 216 of the tubular body 202 is sloped at the first end 206 and the second end 207 of the measurement section 205 where the fluid passage 208 transitions between the circular and oblong circular shapes.

A cross-sectional area of the fluid passage 208 is the same throughout the entire length of the tubular body 202 along the longitudinal axis L, including at the inlet 209 and the outlet 210 and through the measurement section 205. The reduction in width of the fluid passage 208 in the measurement section 205 allows for a more uniform flow of liquid through the measurement section 205 and alleviates swirling and eddying of the flow through the measurement section, which may disrupt transmission of the ultrasonic sound wave. The cross-sectional area of the fluid passage 208 is maintained along its entire longitudinal length, including through the measurement section 205, in order to avoid changing the flow rate of the liquid (speeding up and slowing down) as the liquid enters and leaves the measurement section 205.

As shown in FIGS. 9 and 10, a strainer element 240 may be provided at the inlet 209 of the fluid passage 208 and disposed within a shoulder defined in the interior surface 216 of the tubular body 202 at the first end 203 of the tubular body 202. The strainer element 240 is provided at the inlet 209 in order to prevent larger debris carried in the flow of liquid, such as rocks or gravel, from passing through the tubular body 202 to the measurement section 205 where the debris might damage the ultrasonic transducers 220a, 220b or the reflective elements 230a, 230b.

With reference to FIGS. 10-13, the two reflective elements 230a, 230b are each disposed on a respective bracket 231 inserted into the fluid passage 208 from a respective end 203, 204 of the tubular body 202. Each bracket 231 is removably inserted in a respective slot 217, 218 defined in the interior surface 216 of the tubular body 202 and extending along the longitudinal axis L from a respective one of the first end 203 and second end 204 of the tubular body 202 to the measurement section 205. Each bracket 231 includes a body portion 232 that is slidable into the respective slots 217, 218 and an inclined portion 233 that holds one of the reflective elements 230a, 230b such that the reflective elements 230a, 230b may extend into the fluid passage 208 of the tubular body 202.

Figure 11:
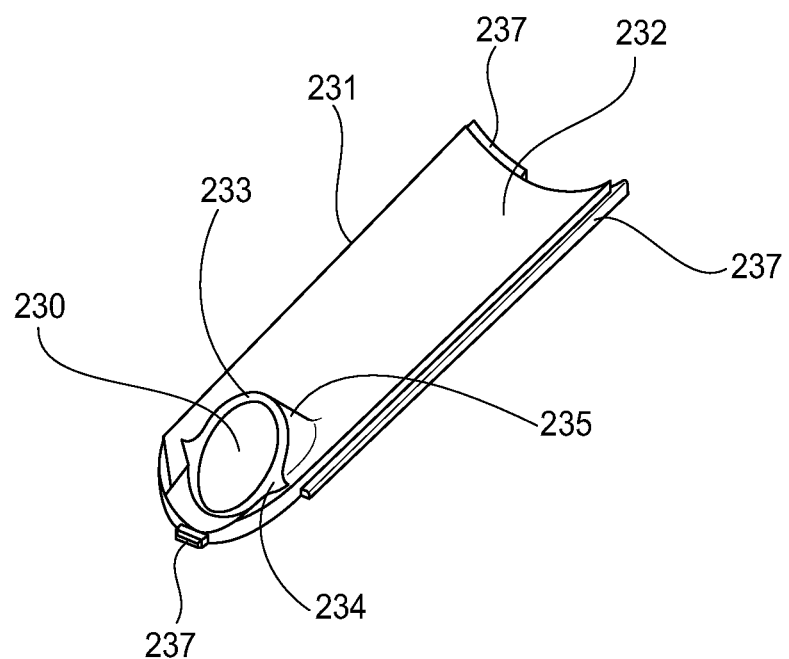
FIG. 11 is a perspective view of a reflective element and bracket assembly of the ultrasonic flow meter of FIG. 9.
Figure 12:
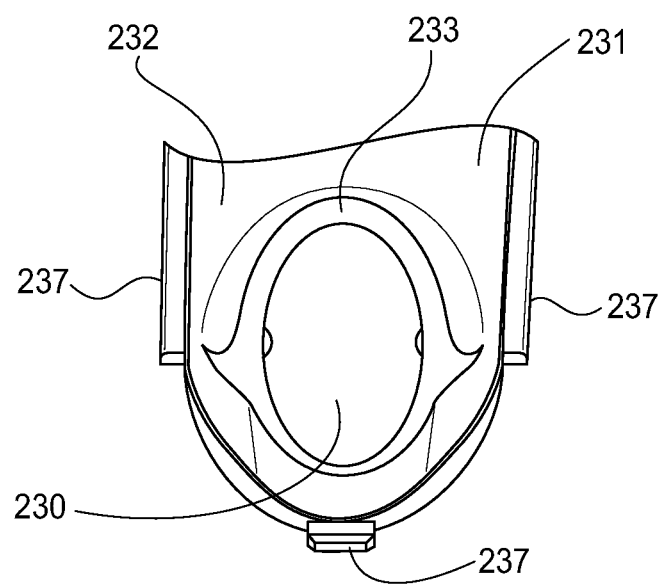
FIG. 12 is an enlarged view of a portion of the reflective element and bracket assembly of FIG. 11.
Figure 13:
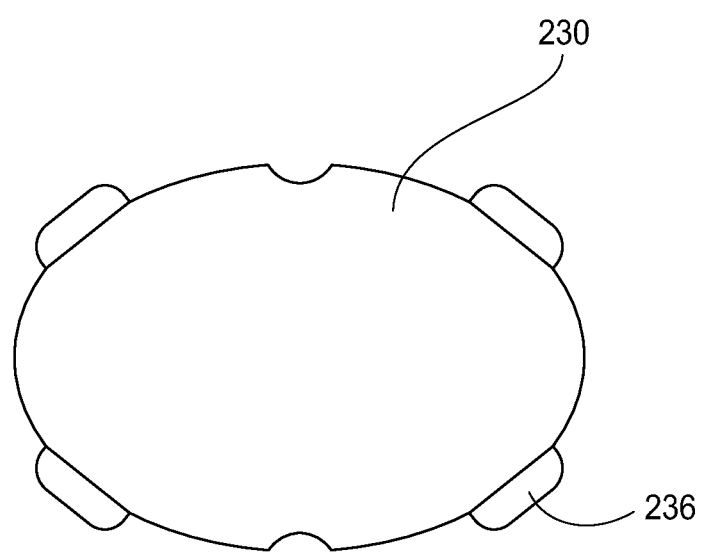
FIG. 13 is a front view of a reflective element of the assembly of FIG. 11.

As shown in FIGS. 11 and 12, the inclined portion 233 of the bracket 231 defines an inclined surface 234 that holds a reflective element 230 at an angle with respect to the longitudinal axis L that is appropriate for directing the ultrasonic sound beam along the substantially Z-shaped travel path 250, as discussed above. The reflective element 230 is molded into the inclined portion 233 of the bracket 231. To that end, the reflective element 230 may include a plurality of tabs 236, shown in FIG. 13, for forming a positive engagement between the reflective element 230 and the bracket 231 as the bracket is molded around the reflective element 230. Additionally, as shown in FIG. 13, the reflective element 230 is symmetric in order to simplify the process of molding to the bracket 231.

As shown in FIG. 11, the inclined portion 233 of the bracket 231 also defines an opposing inclined surface 235 that is angled and shaped to minimize the head loss created by the inclined portion 233 extending into the fluid passage 208 of the tubular body 202. In particular, the opposing inclined surface 235 of the bracket 231 is configured to minimize the area of the fluid passage 208 that is blocked and maintain a more uniform flow through the fluid passage 208.

With reference to FIGS. 10-12, each bracket 231 is held in place within the respective slot 217, 218 by forming a friction fit with the slot 217, 218 to allow for easy installation and removal of the brackets 231 from the tubular body 202. Additionally, each bracket 231 includes a plurality of protrusions 237 on the sides of the body 232 of the bracket 231 and at the end of the body 232. The protrusions 237 of the brackets 231 slide into corresponding recesses (not shown) formed with the slots 217, 218 in the interior surface 216 of the tubular body 202 and engage the recesses to retain the brackets 231 within the slots 217, 218.

According to one embodiment of the invention, the piping arrangement 101, 201 is made from a plastic material. In particular, the piping arrangement 101, 201 may be made from an injected fiber thermoplastic, such as Polyphenylene Sulfide (PPS) or Polyphthalamide (PPA). The piping arrangement 101, 201 may also be made from Polyvinyl Chloride (PVC) piping. The piping arrangement 101, 201 may be a unitary molded polymeric glass, such as fiberglass. The piping arrangement 201, 202 may be a portion of a larger piping network configured to provide water to residential or commercial buildings. The ultrasonic flow meter 100, 200 may be a modular unit that is installed into pre-existing piping arrangements.

The ultrasonic flow meter 100, 200 has a high structural stability that assists in creating an even flow of water through the ultrasonic flow meter 10. The ultrasonic flow meter 100, 200 also provides a highly accurate measurement of the velocity of the water flow through the tubular body 102, 202. This highly accurate measurement allows for a highly accurate calculation of the flow rate of the liquid through the tubular body 102, 202. Further, the ultrasonic flow meter 100, 200 experiences a lower head loss in the water flow through the tubular body 102, 202, which creates a more stable flow of water through the ultrasonic flow meter 100, 200. A more stable flow of liquid allows the ultrasonic flow meter 100, 200 to obtain a more accurate measurement of the velocity of liquid flow, which would be made more difficult with more turbulence in the stream of liquid. The head loss of the liquid flow is reduced in the ultrasonic liquid meter 100, 200 by minimizing the distance that the reflective elements 130a, 130b, 230a, 230b extend into the fluid passage 108, 208. By reducing the portion of the reflective elements 130a, 130b, 230a, 230b that is exposed in the fluid passage 108, 208, the obstructions in the fluid passage 108, 208 that could create a head loss in the liquid flow are also reduced. Further, by reducing the portion of the reflective elements 130a, 130b, 230a, 230b that is exposed in the fluid passage 108, 208, an operator of the ultrasonic flow meter 100, 200 is capable of seeing through the fluid passage 108, 208 of the tubular body 102, 202 from the inlet 109, 209 to the outlet 110, 210. Since there are minimal obstructions in the fluid passage 108, 208, the operator may look through the tubular body 102, 202 from end to end for inspection or maintenance of the ultrasonic flow meter 100, 200.

With reference to FIGS. 3-13, a method of assembling an ultrasonic flow meter 100, 200 according to an embodiment of the invention includes removably inserting the brackets 131, 231 carrying the reflective elements 130a, 130b, 230a, 230b into the slots 117, 118, 217, 218 formed in the interior surface 116, 216 of the tubular body 102, 202. End rings 140 may be inserted in the first end 103 and the second end 104 of the tubular body 102 to retain the brackets 131 in the slots 117, 118. The ultrasonic transducers 120a, 120b, 220a, 220b are inserted into the respective recesses 113, 114, 213, 214 defined in the opposing sides 111, 112, 211, 212 of the tubular body 102, 202. Bands 261 may then be placed about the outer circumferential surface of the tubular body 202 to retain the ultrasonic transducers 220a, 220b in place. The tubular body 102, 202 may then be installed in a larger piping system (not shown).

With further reference to FIGS. 3-13, a method of measuring a flow rate of a liquid through a flow meter device 100, 200 includes providing a flow meter device 100, 200 as described above with reference to either FIGS. 3-8 or FIGS. 9-13. The method further includes creating a flow of liquid through the piping arrangement 101, 201; generating an ultrasonic sound wave with one of the ultrasonic transducers 120a, 220a; directing the ultrasonic sound wave with the reflective elements 130a, 130b, 230a, 230b along a travel path 150, 250 through the fluid passage 108, 208 in the measurement section 105, 205 of the tubular body 102, 202 from the ultrasonic transducer 120a, 220a generating the ultrasonic sound wave to the other ultrasonic transducer 120b 220b, the travel path 150, 250 being substantially Z-shaped; receiving the ultrasonic sound wave at the other ultrasonic transducer 120b, 220b; measuring a speed of the ultrasonic sound wave through the measurement section 105, 205; and calculating the flow rate of the liquid based on the measured speed of the ultrasonic sound wave. According to one embodiment of the invention, the ultrasonic transducers 120a, 120b, 220a, 220b are in communication with a register 170, 270, which includes a controller microprocessor that commands the ultrasonic transducers 120a, 120b, 220a, 220b to transmit the ultrasonic sound wave and receives data from the ultrasonic transducers 120a, 120b, 220a, 220b to measure the speed of the ultrasonic sound wave through the measurement section 105, 205 and calculate the flow rate of the liquid through the measurement section 105, 205 based on the measured speed. According to this embodiment, the controller microprocessor acts as the means for measuring the speed and calculating the flow rate of the liquid.

While specific embodiments of the invention have been described in detail, it will be appreciated by those having ordinary skill in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. An ultrasonic flow meter device, comprising:
 a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
 at least two ultrasonic transducers disposed on opposing sides of the tubular body and spaced apart along the longitudinal axis; and
 at least two reflective elements disposed on the opposing sides of the tubular body and spaced apart along the longitudinal axis,
 wherein the at least two ultrasonic transducers are configured to generate and/or receive an ultrasonic sound wave and the at least two reflective elements are configured to direct the ultrasonic sound wave through the fluid passage in the measurement section of the tubular body from one of the at least two ultrasonic transducers to another of the at least two ultrasonic transducers in a travel path that is substantially Z-shaped,
 wherein the fluid passage includes an inlet defined at the first end of the tubular body and an outlet defined at the second end of the tubular body, the fluid passage having a first width at the inlet and the outlet and a second width in the measurement section of the tubular body,
 wherein the first width of the fluid passage is larger than the second width and a cross-sectional area of the fluid passage at the inlet and the outlet is the same as a cross-sectional area of the fluid passage in the measurement section, and
 wherein the fluid passage in the measurement section has an oblong circular shape configured to create an elliptical flow of liquid through the measurement section.

2. The ultrasonic flow meter device according to claim 1, wherein the fluid passage has a circular shape at the inlet and the outlet.

3. The ultrasonic flow meter device according to claim 1, wherein the at least two ultrasonic transducers are disposed at opposing ends of the measurement section.

4. The ultrasonic flow meter device according to claim 1, wherein the at least two reflective elements are disposed at opposing ends of the measurement section and are each disposed on the tubular body opposite to a respective one of the at least two ultrasonic transducers.

5. The ultrasonic flow meter device according to claim 1, wherein the at least two ultrasonic transducers are disposed in recesses defined in the tubular body.

6. The ultrasonic flow meter device according to claim 1, wherein each of the at least two reflective elements is disposed on a respective bracket inserted in the fluid passage.

7. The ultrasonic flow meter device according to claim 6, An ultrasonic flow meter device, comprising:
 a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
 at least two ultrasonic transducers disposed on opposing sides of the tubular body and spaced apart along the longitudinal axis; and
 at least two reflective elements disposed on the opposing sides of the tubular body and spaced apart along the longitudinal axis,
 wherein the at least two ultrasonic transducers are configured to generate and/or receive an ultrasonic sound wave and the at least two reflective elements are configured to direct the ultrasonic sound wave through the fluid passage in the measurement section of the tubular body from one of the at least two ultrasonic transducers to another of the at least two ultrasonic transducers in a travel path that is substantially Z-shaped, wherein the fluid passage includes an inlet defined at the first end of the tubular body and an outlet defined at the second end of the tubular body, the fluid passage having a first width at the inlet and the outlet and a second width in the measurement section of the tubular body, wherein the first width of the fluid passage is larger than the second width and a cross-sectional area of the fluid passage at the inlet and the outlet is the same as a cross-sectional area of the fluid passage in the measurement section, wherein each of the at least two reflective elements is disposed on a respective bracket inserted in the fluid passage, and wherein each bracket is removably inserted in a slot defined in an interior surface of the tubular body and extending along the longitudinal axis from a respective one of the first end and the second end of the tubular body to the measurement section.

8. The ultrasonic flow meter device according to claim 6, An ultrasonic flow meter device, comprising:
a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
at least two ultrasonic transducers disposed on opposing sides of the tubular body and spaced apart along the longitudinal axis; and
at least two reflective elements disposed on the opposing sides of the tubular body and spaced apart along the longitudinal axis,
wherein the at least two ultrasonic transducers are configured to generate and/or receive an ultrasonic sound wave and the at least two reflective elements are configured to direct the ultrasonic sound wave through the fluid passage in the measurement section of the tubular body from one of the at least two ultrasonic transducers to another of the at least two ultrasonic transducers in a travel path that is substantially Z-shaped,
wherein the fluid passage includes an inlet defined at the first end of the tubular body and an outlet defined at the second end of the tubular body, the fluid passage having a first width at the inlet and the outlet and a second width in the measurement section of the tubular body,
wherein the first width of the fluid passage is larger than the second width and a cross-sectional area of the fluid passage at the inlet and the outlet is the same as a cross-sectional area of the fluid passage in the measurement section,
wherein each of the at least two reflective elements is disposed on a respective bracket inserted in the fluid passage, and
wherein each bracket comprises an inclined surface for holding the respective reflective element at an angle with respect to the longitudinal axis.

9. An ultrasonic flow meter device, comprising:
a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
at least two ultrasonic transducers disposed on opposing sides of the tubular body and spaced apart along the longitudinal axis; and
at least two reflective elements disposed on the opposing sides of the tubular body and spaced apart along the longitudinal axis,
wherein each of the at least two reflective elements is disposed on a respective bracket removably inserted in a slot defined in an interior surface of the tubular body and extending along the longitudinal axis from a respective one of the first end and the second end of the tubular body to the measurement section, and
wherein the at least two ultrasonic transducers are configured to generate and/or receive an ultrasonic sound wave and the at least two reflective elements are configured to direct the ultrasonic sound wave through the measurement section of the tubular body from one of the at least two ultrasonic transducers to another of the at least two ultrasonic transducers.

10. The ultrasonic flow meter device according to claim 9, wherein at least two reflective elements are configured to direct the ultrasonic sound wave in a travel path that is substantially Z-shaped.

11. The ultrasonic flow meter device according to claim 9, wherein the fluid passage includes an inlet defined at the first end of the tubular body and an outlet defined at the second end of the tubular body, the fluid passage having a first width at the inlet and the outlet and a second width in the measurement section of the tubular body, and
wherein the first width of the fluid passage is larger than the second width.

12. The ultrasonic flow meter device according to claim 11, wherein the fluid passage has a circular shape at the inlet and the outlet.

13. The ultrasonic flow meter device according to claim 11, wherein the fluid passage in the measurement section has an oblong circular shape.

14. The ultrasonic flow meter device according to claim 11, wherein the fluid passage has a constant cross-sectional area from the inlet, through the measurement section, and to the outlet.

15. The ultrasonic flow meter device according to claim 9, wherein the at least two ultrasonic transducers are disposed at opposing ends of the measurement section, and
wherein the at least two reflective elements are disposed at opposing ends of the measurement section and are each disposed on the tubular body opposite to a respective one of the at least two ultrasonic transducers.

16. The ultrasonic flow meter device according to claim 9, wherein the at least two ultrasonic transducers are disposed in recesses defined in the tubular body.

17. The ultrasonic flow meter device according to claim 9, wherein each bracket comprises an inclined surface for holding the respective reflective element at an angle with respect to the longitudinal axis.

18. A method of measuring a flow rate of a liquid through a flow meter device, comprising:
providing a flow meter device, comprising:
a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;

two ultrasonic transducers disposed on opposing sides of the tubular body and spaced apart along the longitudinal axis; and at least two reflective elements disposed on the opposing sides of the tubular body and spaced apart along the longitudinal axis, wherein the fluid passage includes an inlet defined at the first end of the tubular body and an outlet defined at the second end of the tubular body, the fluid passage having a first width at the inlet and the outlet and a second width in the measurement section of the tubular body, wherein the fluid passage in the measurement section has an oblong circular shape, and wherein the first width of the fluid passage is larger than the second width and a cross-sectional area of the fluid passage at the inlet and the outlet is the same as a cross-sectional area of the fluid passage in the measurement section;

creating a flow of liquid through the piping arrangement, wherein the oblong circular shape of the fluid passage in the measurement section creates an elliptical flow of the liquid through the measurement section;

generating an ultrasonic sound wave with one of the two ultrasonic transducers;

directing the ultrasonic sound wave with the at least two reflective elements along a travel path through the fluid passage in the measurement section of the tubular body from the ultrasonic transducer generating the ultrasonic sound wave to the other ultrasonic transducer, the travel path being substantially Z-shaped;

receiving the ultrasonic sound wave at the other ultrasonic transducer;

measuring a speed of the ultrasonic sound wave through the measurement section; and calculating the flow rate of the liquid based on the measured speed of the ultrasonic sound wave.

19. A flow meter device for measuring a flow rate of a liquid, comprising:

a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;

two ultrasonic transducers disposed on opposing sides of the tubular body and spaced apart along the longitudinal axis; and at least two reflective elements disposed on the opposing sides of the tubular body and spaced apart along the longitudinal axis, wherein the fluid passage includes an inlet defined at the first end of the tubular body and an outlet defined at the second end of the tubular body, the fluid passage having a first width at the inlet and the outlet and a second width in the measurement section of the tubular body, wherein the first width of the fluid passage is larger than the second width and a cross-sectional area of the fluid passage at the inlet and the outlet is the same as a cross-sectional area of the fluid passage in the measurement section, wherein the fluid passage is configured to accommodate a flow of the liquid through the piping arrangement, wherein the fluid passage in the measurement section has an oblong circular shape configured to create an elliptical flow of the liquid through the measurement section wherein one of the ultrasonic transducers generates an ultrasonic sound wave, wherein the at least two reflective elements direct the ultrasonic sound wave along a travel path through the fluid passage in the measurement section of the tubular body from the ultrasonic transducer generating the ultrasonic sound wave to the other ultrasonic transducer, the travel path being substantially Z-shaped, wherein the other ultrasonic transducer receives the ultrasonic sound wave, and wherein the device further comprises means for measuring a speed of the ultrasonic sound wave through the measurement section and means for calculating the flow rate of the liquid based on the measured speed of the ultrasonic sound wave.

* * * * *

UNITED STATES PATENT AND TRADEMARK OFFICE
CERTIFICATE OF CORRECTION

PATENT NO. : 9,714,855 B2
APPLICATION NO. : 14/997810
DATED : July 25, 2017
INVENTOR(S) : Omri Bar-on Page 1 of 1

It is certified that error appears in the above-identified patent and that said Letters Patent is hereby corrected as shown below:

In the Claims

Column 16, Line 50, delete "The ultrasonic flow meter device according to claim 6,"

Column 17, Line 25, delete "The ultrasonic flow meter device according to claim 6,"

Signed and Sealed this
Thirtieth Day of April, 2019

Andrei Iancu
*Director of the United States Patent and Trademark Office*